April 6, 1965
J. F. NENZELL
3,176,747
SELF-SEALING NUT ASSEMBLY
Filed July 27, 1953
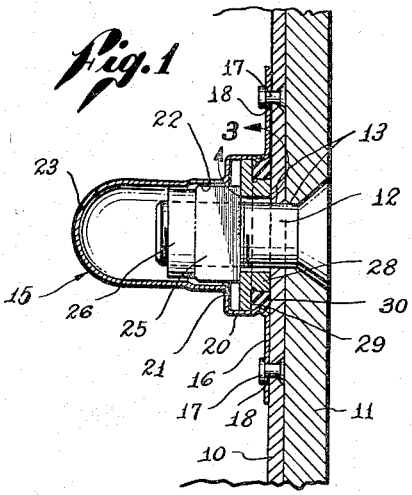
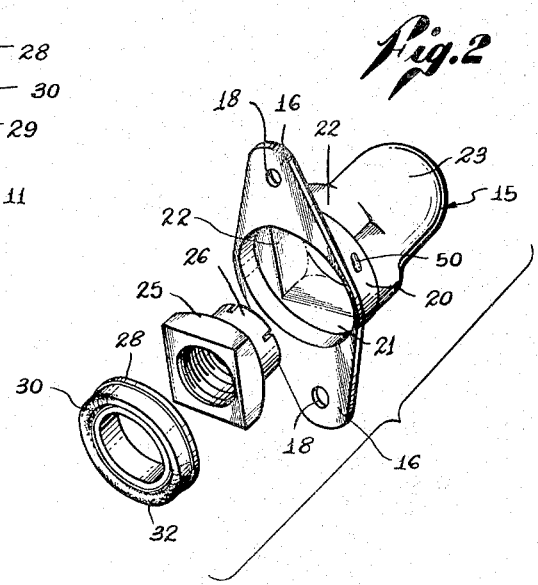
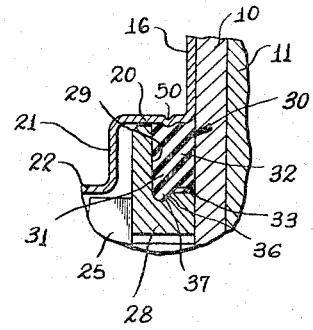
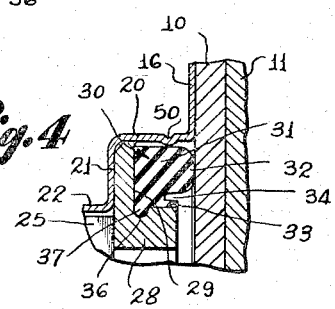
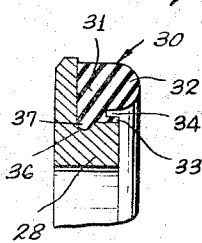
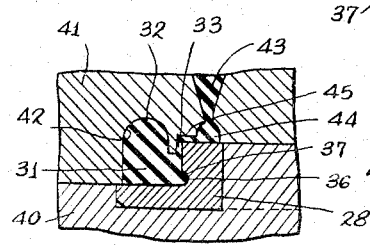
INVENTOR.
JOSEPH F. NENZELL
BY
Fulwider, Mattingly & Babcock
Attorneys

United States Patent Office 3,176,747
Patented Apr. 6, 1965

---

3,176,747
SELF-SEALING NUT ASSEMBLY
Joseph F. Nenzell, Culver City, Calif., assignor to The Mathewson Corporation, Inglewood, Calif., a corporation of California
Filed July 27, 1953, Ser. No. 370,357
6 Claims. (Cl. 151—41.7)

This invention relates generally to sealing devices, and more particularly to a self-sealing nut assembly for use in sealing around the opening provided for a threaded fastener. The invention is especially advantageous in connection with fasteners used to secure removable corners in place upon tanks or other pressure structures which have restricted interior access, and where the seal must withstand repeated removal and installation of the fasteners.

The principles of the invention are applied in the construction of a composite nut assembly which includes an outer shell or nut anchor that holds a nut securely in place to a structure and prevents turning during the connection of a threaded member therein. Such nut anchors are used extensively to save time and labor in the assembly and fabrication of aircraft, automobiles, and the like. The nut anchor or shell used in the present invention is of the so-called dome-type which has a closed or blind end outwardly of the nut socket.

In order to seal the opening around the threaded fastener which engages with the nut assembly, I provide sealing means mounted in the shell and adapted to be forced into sealing engagement with the wall of the shell and the surface of the structure which the shell abuts. I thus seal off the opening around the threaded fastener from the space surrounding the shell without the necessity for any seal around the shank of the fastener itself. Such an arrangement is particularly desirable where the fastener is subject to frequent removals and installations as the effectiveness of the seal is not affected by any wear which takes place in the threads of the fastener and the nut. Also slight misalignment of the nut and fastener, or variations in tolerances do not affect the security of the seal.

With the foregoing in mind, it is a major object of the invention to provide a self-sealing nut assembly which provides an effective high pressure fluid seal around the opening for a threaded fastener without direct contact with the fastener.

Another object of the invention is to provide a self-contained nut assembly which can be readily installed with all types of threaded fasteners and will provide an effective seal withstanding repeated installations of the fastener.

It is also an object of the invention to provide a self-sealing nut assembly having a seal which includes a resilient, deformable packing member and a rigid retaining body which protects the packing member and holds it in a compressed state of sealing contact for its entire service life.

An additional object of the invention is to provide a seal including a rigid retaining body and an interlocked packing member molded permanently thereon and having a volumetric relationship with respect to the retaining body such as to insure effective sealing contact.

It is a further object of the invention to provide a self-sealing nut assembly which allows the use of a floating nut to compensate for misalignment of the threaded fastener.

Still another object of the invention is to provide a nut assembly of the character described which is lightweight and simple in construction.

These and other objects and advantages of the invention will become apparent from the following detailed description of a preferred form thereof, and from an inspection of the accompanying drawings in which:

FIGURE 1 is a cross-section showing a typical installation of the preferred device;

FIGURE 2 is an exploded view showing the elements of the nut assembly;

FIGURE 3 is an enlarged sectional detail taken in the circle 3 of FIGURE 1;

FIGURE 4 is a view similar to FIGURE 3 showing the relationship of the seal to the shell and abutting structure before the nut is taken up;

FIGURE 5 is a partial cross-section of the sealing element per se; and

FIGURE 6 is a detail showing the method of forming the packing member onto the retaining body so as to achieve proper volumetric relationships.

Referring now to the drawings and particularly to FIGURES 1 and 2 thereof, the invention is shown in a typical installation wherein a pair of overlapping plates 10 and 11 as secured together by a threaded fastener 12. As illustrated, the fastener 12 is a threaded countersunk screw passing through plate openings 13, and the structure is illustrative of a tank or other pressure vessel where a fluid barrier must be maintained across the plates 10 and 11.

The nut assembly includes an outer shell or nut anchor 15 which is formed with an enlarged flanged base 16 adapted to abut the surface of plate 10 surrounding the opening 13, and to be secured non-rotatably therein by rivets or other conventional fasteners 17 passed through a pair of flange openings 18. Projecting outwardly from base 16 is a short, cylindrical wall 20 shouldered inwardly to form an annular seat 21 which is spaced from the surface of plate 10. Shell 15 continues beyond seat 21 in a non-circular socket portion 22 of reduced diameter which is closed at its outer end by a somewhat elongated dome or cap 23. As can be appreciated, the complete shell 15 is a single unitary element of sheet metal or the like, and may be economically formed by stamping operations.

Fitted within the socket portion 22 is a nut 25 which may be of any conventional type. The sides of nut 25 correspond with the shape of the walls of socket 22 so as to fit slidably therein in non-rotatable relationship. As shown, nut 25 is of the locking type having an outer split skirt 26 which is of restricted bore and grips in tight frictional engagement with the threaded shank of fastener 12. Skirt 26 extends within the dome 23, but nut 26 is limited in outward movement by engagement with the outer end corners of socket 23.

In order to compensate for any slight misalignment of fastener 12, nut 25 is mounted loosely within socket 22 and may float laterally or rock slightly therein, being held, however, at all times from independent rotation. While this arrangement is particularly advantageous, it is to be understood that the nut and shell may both be modified considerably for different conditions without departing from the principles of the invention.

In order to provide a fluid barrier preventing the flow of fluid through the clearance in opening 13 surrounding fastener 12, I provide sealing means which, in effect, seals off around the shell base 16 so that the space surrounding the shell is closed from the interior of the shell. Thus, fluid cannot enter the shell 15 to pass through opening 13, and there is no necessity to seal around the shank of the fastener 12.

Mounted within the annular seat portion defined by side wall 20 and seat 21 is an annular retaining body or ring 28 which has an outside diameter such as to fit slidably within wall 20 and a smooth walled interior bore fitting easily over the shank of fastener 12. The outer end of body 28 is adapted to bear against the end of nut 25 to confine the nut within socket 22, and the inner end face of the body is adapted to bear flatly against the surface of plate 10. As nut 25 is pulled inwardly by the tightening of fastening screw 12, it can be seen that body 28 will be forced tightly against plate 10 although normally it is spaced slightly therefrom as seen in FIGURE 4.

The inner portion of body 28 is of reduced external diameter so as to define with the adjacent portion of wall 20 an annular retaining groove 29. Fitted within groove 29 is a resilient deformable packing member 30 that is of uncompressed cross-sectional shape as is best seen in FIGURE 5. Member 30 is made of rubber-like material, preferably a synthetic rubber which is resistant to most fluids and maintains its resilience over a wide temperature range. Member 30 is molded to the retaining body 28 and has a total volume which is substantially equal to the volume of groove 29, although the uncompressed shape of the member is not such as to fill the groove.

The cross-sectional shape of member 30 is such that it has a solid bottom portion 31 joined integrally with a raised projecting portion 32 and a side spacer piece or fillet 33 which results from the method used for molding the member to body 28. Projecting portion 32 extends inwardly beyond the inner end face of body 28 and is of rounded, generally semi-circular, section joining smoothly with the outside peripheral wall of the member which is spaced slightly inwardly from the outside peripheral edge of the body. Spacer piece 33 lies against the reduced portion of body 28 and is separated from projecting portion 32 by a continuous channel or void space 34 which is of relatively shallow depth. Both the portion 32 and the piece 33 are, of course, molded integrally with the member bottom portion 31.

In order to interlock member 30 securely within body 28, the latter is provided with a circumferential recess 36 extending thereabout adjacent bottom portion 31. An interlocking flange 37 formed on member 30 in the molding operation mates complementally within recess 36 to positively prevent any movement of the packing member relative to the retaining body.

The principles of molding packing member 30 to body 28 follow those set forth in my copending application Serial No. 319,697, filed November 10, 1952, for "Fluid Seal and Manufacture Thereof," now Patent 2,717,793. In general, these principles provide for obtaining the proper volumetric relationship between the packing member and its retaining groove by the use of cooperating molding dies. As is shown in the simplified view of FIGURE 6, a lower die or mold 40 has a cavity on the top face thereof shaped to receive the retainer body 28. Mold 40 is stepped so that its outside portion stops flush with the wall forming the bottom of groove 29 and its inside portion lies flush with the top or inner end face of the body. A cooperating upper mold 41 is shaped to seat downwardly against mold 40 and is provided with a cavity 42 shaped to form member 30. On the inner side of cavity 42 are sprue openings 43 to admit packing material in a plastic state to a small overflow or flash groove 44 which extends around the entire length of the cavity and is communicated thereinto by a slot 45.

As packing material is flowed under pressure into cavity 42, it forms the packing member 30, in accordance with the complemental shape of the cavity. The purpose of the side spacer piece 33 is to compensate for variations in the dimensional tolerances of the retaining body as is described fully in my aforesaid application. It should also be noted that as the packing material flows into the recess 36, it forms the locking flange 37 so as to bond the packing member directly to the ring.

After the nut 25 is seated within socket 22 in the assembly of the device, the body 28, with the packing member 30 thereon, is fitted into shell 15 to lie against seat 21. To provide a unitary structure, body 28 is locked within shell 15 and at the same time, confining nut 25 in place. To this end, the side wall 20 is struck at spaced points with a suitable tool to form depressions 50 which limit outward movement of body 28. The position of depressions 50 is such that they permit limited sliding movement of body 28 so that the inner end face thereof may bear against plate 10. As an alternative, body 28 may be locked in a press fit within shell 15.

When shell 15 is first secured against plate 10, as is seen in FIGURE 4, the projecting portion 32 of the packing member makes light contact with the surface of plate 10. It should be noted that at this time, the side of member 30 is spaced from the side wall 20 so as to define a continuous void space therein. If the volume of member 30 is made proper by the method of manufacture described, it will substantially equal the volume of channel 34 and the void on the outside of the member.

As fastener 12 is inserted through opening 13 and into engagement with nut 25, threaded advancement of the fastener will pull the nut towards plate 10. Body 28 is in turn forced against plate 10 into the position as shown in FIGURE 3. The effect of this is to flatten projection 32 resiliently deforming the material therein, and at the same time forcing it laterally against wall 20. Thus, an area of sealing contact is established both against the surface of plate 10 and against shell wall 20. These areas of sealing contact effectively prevent any flow of fluid from the exterior to interior of shell 15.

The seal thus provided does not depend upon the fit or alignment between fastener 12 and the opening 13 or nut 25. It is unaffected by repeated installations of the fastener, and because of the use of the retaining body, together with the packing member, is effective against high pressure. It is to be understood that changes of design and construction can be made without departing from the scope of the invention, and therefore, I do not wish to be restricted except as defined in the appended claims.

I claim:

1. A self-sealing dome nut assembly comprising: a domed anchor shell having an inner supporting base and an outer nut-receiving socket; means on said base for securing said base to a structural element; a nut fitted within said socket; a rigid annular retainer body in said shell and of a size to bear against the inner end of said nut within said socket, said body being positioned for direct engagement with the surface of a structure on which said base is seated; and a deformable packing member fitted around the outer periphery of said body and shaped to bear in sealing engagement with said shell and said structure when said body is forced against said structure by said nut.

2. A self-sealing dome nut assembly comprising: a domed anchor shell having an inner supporting base and an outer nut-receiving socket; means on said base for securing said base to a structural element; a nut fitted within said socket and provided with a threaded hole therein; a rigid annular retaining body in said shell and of a size to bear against the inner end of said nut, said body being positioned for direct engagement with the surface of a structure on which said base is seated and having an inner portion of reduced diameter defining with the wall of said shell a retaining groove, said body having a hole therethrough which is unthreaded and larger than said threaded hole; and a resilient deformable packing member fitted within said groove and of volume substantially equal to that of said groove, said member having a portion projecting inwardly beyond said body whereby said member is compressed into sealing engagement with said structure and said shell when said body is forced against said structure by said nut.

3. A self-sealing dome nut assembly comprising: a domed anchor shell having an inner supporting base, an annular seat portion and an outer nut-receiving socket; means on said base for securing said base to a supporting structure; a nut fitted non-rotatably within said socket and having a threaded hole therein; a rigid annular retainer body mounted in said seat and of a size to bear against the inner end of said nut, said body being positioned for direct engagement with the surface of said structure and having an inner portion of reduced diameter defining with the side wall of said seat a retaining groove, said body having a hole therethrough which is unthreaded and larger than said threaded hole; and a resilient deformable packing member fitted within said groove and molded to said retainer body, said member having a volume substantially equal to that of said groove and being formed with a portion projecting inwardly beyond said body and an outer side edge spaced from the side wall of said seat whereby said member is flattened and compressed into sealing engagement with said structure and said shell when said body is forced against said structure by said nut.

4. A self-sealing dome nut assembly comprising: a domed anchor shell having an inner supporting base, an annular seat portion and an outer nut-receiving socket; means on said base for securing said base to a supporting structure; a nut fitted non-rotatably within said socket; a rigid annular retainer body mounted in said seat with an outer end face of a size to bear against the inner end of said nut and an inner end face positioned for direct engagement with the surface of said structure, said body having an outer portion of diameter substantially equal to the diameter of the side wall of said seat and an inner portion of reduced diameter defining with said side wall a retaining groove, the surface of said portion of reduced diameter having a circumferential recess thereabout; and a resilient deformable packing member fitted within said groove, and having a volume substantially equal to that of said groove, said member being formed with a portion projecting inwardly beyond said body and a locking flange for engaging within said recess to secure said member to said body, said projecting portion being flattened to compress said member into sealing engagement with said structure and said shell when said body is forced against said structure by said nut.

5. A self-sealing dome nut assembly comprising: a domed anchor shell having an inner supporting base, an annular seat portion and an outer nut-receiving socket; means on said base for securing said base to a supporting structure; a nut fitted non-rotatably within said socket; a rigid annular retainer body mounted in said seat with an outer end face of a size to bear against the inner end of said nut and an inner end face positioned for direct engagement with the surface of said structure, said body having an outer rim of diameter substantially equal to the diameter of the side wall of said seat and an inner portion of reduced diameter defining with said side wall a retaining groove, the surface of said portion of reduced diameter having a circumferential recess thereabout; depressed areas on said side wall inwardly of said rim to limit the inward movement of said body; and a resilient deformable packing member fitted within said groove and having a volume substantially equal to that of said groove, said member being formed with a raised portion projecting inwardly beyond said body, a side spacer piece lying against said body surface of reduced diameter and an open channel between said spacer piece and raised portion and within said groove, said member having a locking flange for engaging within said recess to secure said member to said body, and said projecting portion being flattened to compress said member into sealing engagement with said structure and said shell when said body is forced against said structure by said nut.

6. In self-sealing fastener, the combination of: a shell having an open end adapted to seat on a structural element, said shell being closed except for said open end; tab means on said shell for securing said shell to the structural element; a nut within said shell and provided with a threaded hole therethrough; a seal retainer in said shell between said nut and said open end of said shell and disposed adjacent said open end of said shell, said seal retainer having a hole therethrough which is unthreaded and larger than said threaded hole through said nut, and said seal retainer having a central portion and having at the end thereof adjacent said nut an outwardly extending flange; and an annular seal in said shell engaging said central portion of said seal retainer, that side of said flange of said seal retainer which faces in the direction of said open end of said shell, and the inner periphery of said shell, said seal normally extending in the direction of said open end of said shell farther than said seal retainer.

References Cited by the Examiner
UNITED STATES PATENTS

| | | | |
|---|---|---|---|
| 1,281,174 | 10/18 | Kraft | 85—32 |
| 1,512,896 | 10/24 | Kraft | 85—32 |
| 2,396,005 | 3/46 | Gross et al. | |
| 2,551,695 | 5/51 | Oddy | 85—50 X |
| 2,572,401 | 10/51 | Snow | 151—41.71 |

EDWARD C. ALLEN, *Primary Examiner.*

BROUGHTON G. DURHAM, ARTHUR B. MILLER, *Examiners.*